(12) United States Patent
Charrin

(10) Patent No.: US 7,318,297 B2
(45) Date of Patent: Jan. 15, 2008

(54) APPARATUS AND METHOD FOR MOUNTING A DEVICE FOR DISPLAYING AND PRESERVING FLOWER ARRANGEMENTS

(76) Inventor: Philippe Charrin, Les Chiroozes, 26600 Beaumont Monteux (FR)

( * ) Notice: Subject to any disclaimer, the term of this patent is extended or adjusted under 35 U.S.C. 154(b) by 228 days.

(21) Appl. No.: 10/533,478

(22) PCT Filed: Nov. 4, 2003

(86) PCT No.: PCT/EP03/12408

§ 371 (c)(1),
(2), (4) Date: Apr. 29, 2005

(87) PCT Pub. No.: WO2004/040961

PCT Pub. Date: May 21, 2004

(65) Prior Publication Data

US 2006/0112623 A1    Jun. 1, 2006

(30) Foreign Application Priority Data

Nov. 5, 2002    (LU) ........................................ 90983

(51) Int. Cl.
*A01G 5/02*    (2006.01)
(52) U.S. Cl. .................................................... 47/41.01
(58) Field of Classification Search ................ 493/154, 493/448; 53/221, 580
See application file for complete search history.

(56) References Cited

U.S. PATENT DOCUMENTS

| | | | | |
|---|---|---|---|---|
| 2,068,144 A | * | 1/1937 | McAleer | ...................... 53/221 |
| 2,531,386 A | * | 11/1950 | Berman | ...................... 493/448 |
| 2,634,532 A | | 4/1953 | Englert | |
| 5,255,421 A | | 10/1993 | Kamysiak | |
| 6,018,908 A | | 2/2000 | Charrin et al. | |
| 2006/0112623 A1 | * | 6/2006 | Charrin | ...................... 47/41.01 |

FOREIGN PATENT DOCUMENTS

| | | | |
|---|---|---|---|
| EP | 0881167 | | 12/1998 |
| EP | 0828446 | | 12/2000 |
| FR | 2852578 A1 | * | 9/2004 |
| JP | 06040417 A | * | 2/1994 ................... 53/221 |

* cited by examiner

*Primary Examiner*—Francis T. Palo
(74) *Attorney, Agent, or Firm*—Polster, Lieder, Woodruff & Lucchesi, L.C.

(57) ABSTRACT

The invention concerns an apparatus for mounting a device (10) for displaying individual flower arrangements. The device includes a base element (2) which may or may not be equipped with a raised ridge (4) over its entire circumference, and a sheet (5) which may or may not be watertight placed under base element (2) and which is gathered around the center top of the device (10) and held by an fastener (9) such as a ribbon (7) for keeping the sheet (5) sealed around the flower arrangement. The apparatus includes several movable pivoting draping fingers (15) associated with a tightening cord (16) for guiding the sheet (5) around the base element (2), a support base plate (20) that moves along a vertical axis to support device 10, a guide means (21) of a predetermined shape connected to base plate (20) for guiding all the draping fingers (15), and an actuating means (30) for moving the base plate (20) and the guide means (21) along the vertical axis and for pivoting all the draping fingers (15) that are guided by guide means (21) so that the cord (16) is bound around draped sheet (5).

16 Claims, 16 Drawing Sheets

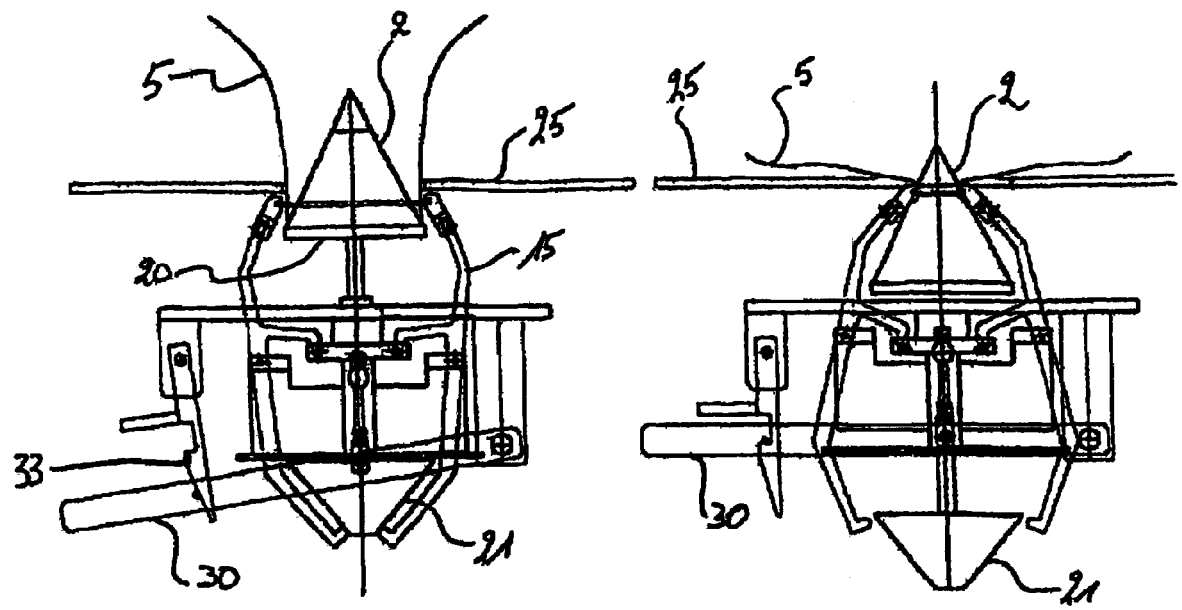
Fig. 3  Fig. 4
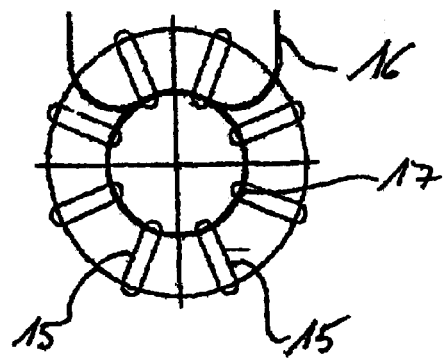
Fig. 5

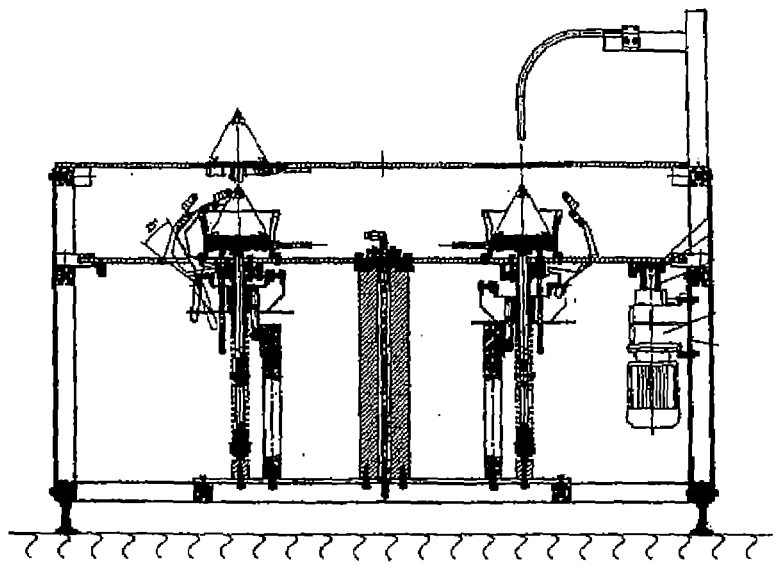
Fig. 19
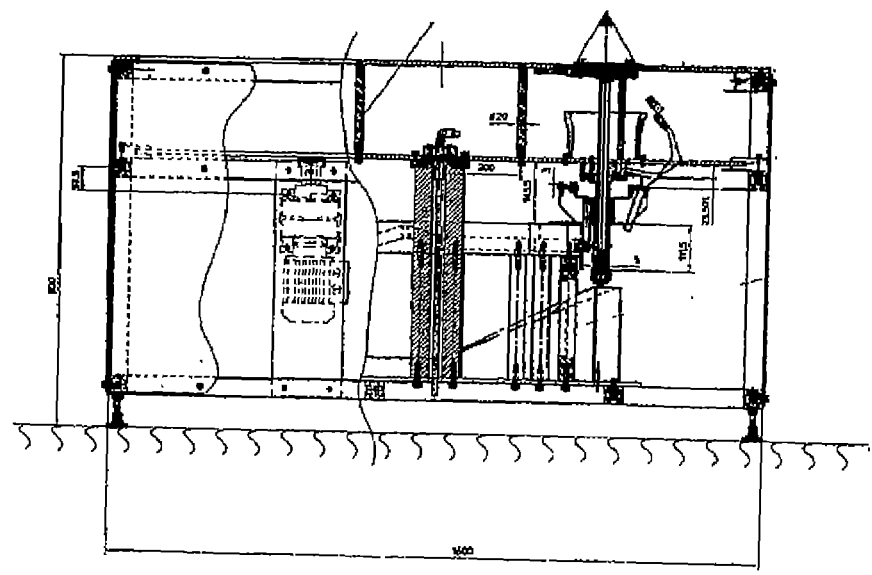

APPARATUS AND METHOD FOR MOUNTING A DEVICE FOR DISPLAYING AND PRESERVING FLOWER ARRANGEMENTS

CROSS-REFERENCE TO RELATED APPLICATIONS

This application is a national stage application under 35 U.S.C. 371, of International Patent Application No. PCT/EP03/12408 with an international filing date of Nov. 4, 2003, which claims priority to Luxemburg Application No. 90983, filed on Nov. 5, 2002, and both of which are hereby incorporated by reference.

BACKGROUND OF THE INVENTION

The present invention involves an apparatus and a method for mounting a device for the presentation and preservation of bouquets of flowers as well as a device for the packaging and preservation of bouquets of flowers.

Patent EP 0828 446 describes a device for the presentation of bouquets comprising a collapsible support, several slats, a rolled-up connection around the slats, a watertight sheet, a primary fastener for the device, and a secondary fastener comprising of a ribbon.

Patent EP 0881 167 reveals a receptacle for bouquets of flowers comprising a circular base element from which multiple elongated elements extend.

SUMMARY OF THE INVENTION

The purpose of the invention is the manufacture of a device for the quick presentation of a bouquet of flowers in the vertical position and preservation of this bouquet of flowers in the vertical position and the preservation of this bouquet by introducing water through an orifice located in the upper part of the device.

Another goal of the invention is to create an apparatus for forming a stable device for presenting all kinds of bouquets.

The present invention involves the quick mounting of a device that is delivered flat and which adapts to any bouquet of cut flowers as a support for storage or sale, by these different shapes with or at sale, by these different shapes with or without bottom, round, square, triangular or other.

This device and its bouquet once they are in shape, folded in all watertight sheets commonly used in the horticultural or florist milieu, allows a reserve of water to be contained. The weight of the water at its base ensures a perfect stability with a predetermined quantity of water for transport.

The principle of the apparatus according to the invention allows the manufacture of a device that transports a bouquet folded with the water reserve contained in its packaging from the place of sale to the destination point, while ensuring the preservation of the bouquet until reaching the final customer, and all along the way without wilting.

According to the invention, the apparatus is designed for mounting a device for the presentation of individual bouquets of flowers, where this device comprises a base element which may or may not have with a raised ridge all around its circumference. The device also includes a sheet, which may or may not be watertight, placed under the base element that converges towards the center top of the device and is held in place by a fastener, such as a ribbon, for holding the watertight sheet around the bouquet. The device comprises several movable draping fingers associated with a tightening cord for guiding the sheet around the base element. A support base is movable along a vertical axis for supporting the device and a guide means of predetermined shape is connected to the support base in order to guide all the draping fingers. An activating means shifts the support base and the guide means along the vertical axis and simultaneously activates all the draping fingers guided by the guide means such that the tightening cord is tightened around the draped sheet.

The method of manufacturing a device for the presentation of individual bouquets of flowers in the invention comprises the steps of:

positioning the sheet and the base element on the support base for supporting the device;

moving the support base towards the bottom along a vertical axis and a guide means of predetermined shape connected to the support base in order to prime the fold in the sheet;

guiding multiple movable pivoting draping fingers associated with a tightening cord for draping the sheet around the base element so as to further tighten the tightening cord around the draped sheet; and holding the sheet around the bouquet with an fastener, such as a ribbon.

DESCRIPTION OF THE DRAWINGS

The present invention will be better understood when referring to the following figures:

FIG. 3 shows the embodiment of FIG. 2 where a fold in a sheet is primed;

FIG. 4 shows the embodiment of FIG. 1 where draping of the sheet is completed;

FIG. 5 shows a partial view from below of embodiment of FIG. 2;

FIGS. 17 to 19 show the draping device of the invention used mechanically on an automated carousel.

DETAILED DESCRIPTION

Figure 1:
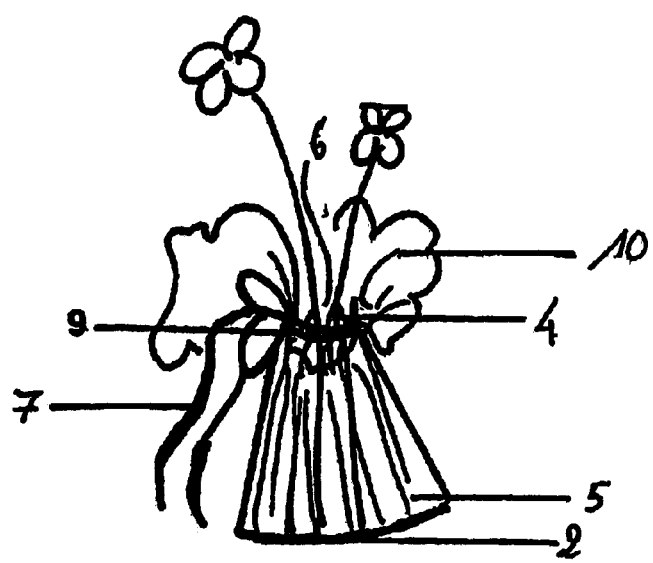
FIG. 1 shows the completed device with a bouquet displayed by an apparatus according to the invention.

FIG. 1 shows a device (10) for the presentation and preservation of individual bouquets of flowers, which holds the flower(s) at the level of a central axis of the device (10). The device (10) includes a base element (2) of any shape, of dimensions, which may or may not be adjustable so that the base element (2) adapts to the size of the bouquets. The base element (2) may or may not have a raised ridge (4) all around the circumference which serves to hold the bouquet in the vertical position, where this bouquet is connected by a primary fastener (9), such as a ribbon (7). The device (10) also includes a sheet (5), which may or may not be watertight, which surrounds the base element (2) and converges towards the center top of device (10).

The fastener (9) holds the sheet (5) around the bouquet, all of which is arranged to allow the introduction of water through an orifice (6) located in the upper part of the device (10). As shown in FIG. 1, base element (2) is a conical receptacle with an orifice (6) located in the upper part. However, the shape of the base element (2) can be circular, square, rectangular, triangular, polygonal, trapezoidal, cruciform, or tripodal with each foot base connected by an arc-shaped element to the adjacent bases. Also, the base element (2) can have one or more waves and one or more hollows for holding the ends of the flower stems in place.

The invention according to the principle of folding the standard bouquet comprises a base element (2) and a sheet (5), which may or may not be watertight when lifted, facilitates the shaping of the sheet (5). In an alternate embodiment of the invention, the device (10) for the presentation of bouquets can also be mounted without a base element (2), but with a watertight sheet (5) alone.

Figure 2:
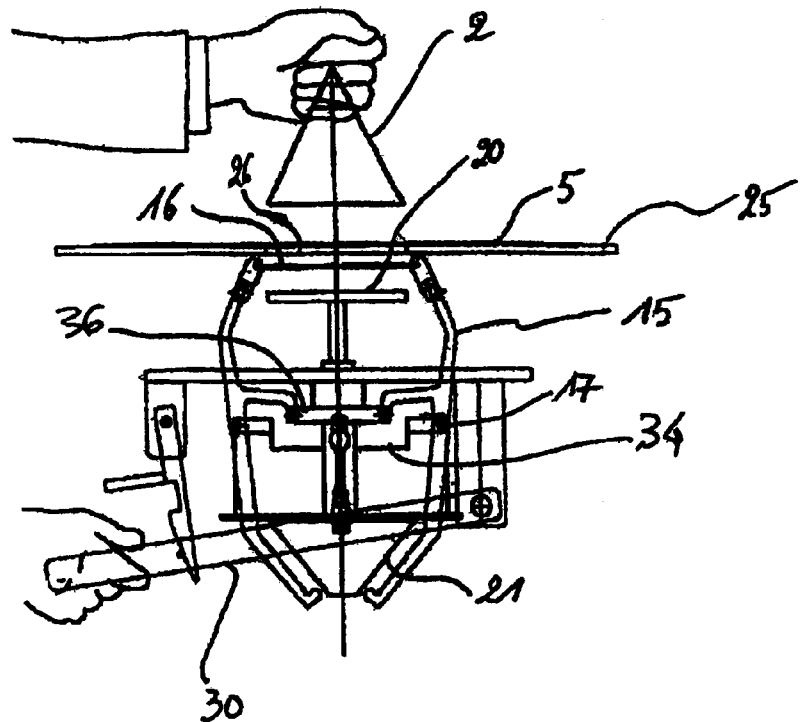
FIG. 2 shows the mounting apparatus according to a preferred embodiment of the invention.
Figure 6:
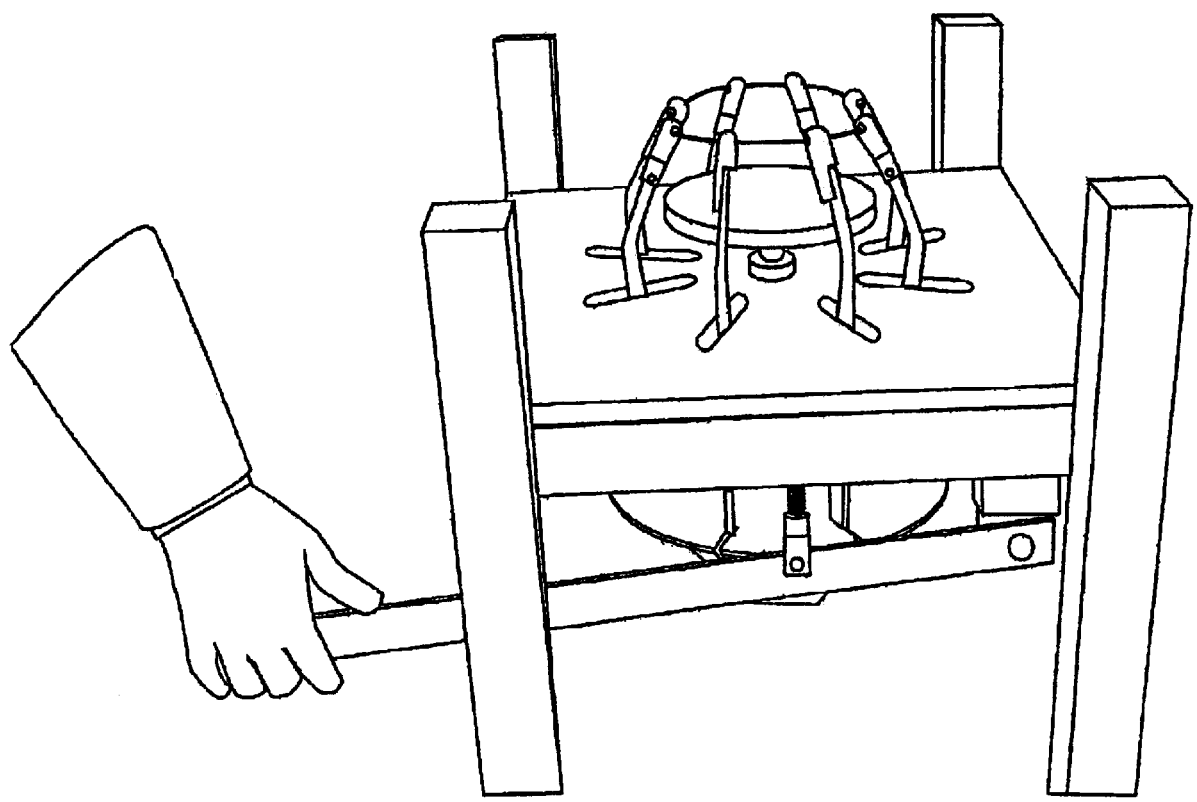
FIG. 6 is a perspective view of the embodiment of FIG. 2 in the position of FIG. 3.
Figure 7:
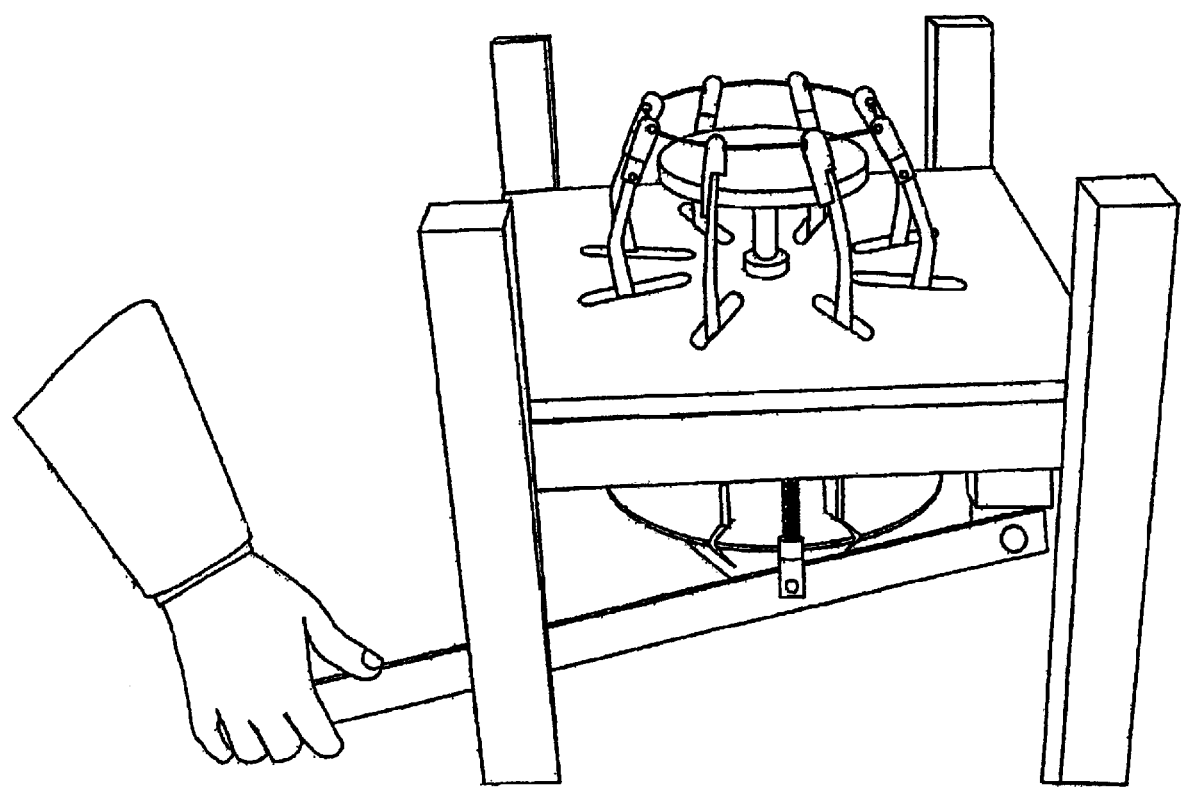
FIG. 7 is a perspective view of the invention in an intermediate position.
Figure 8:
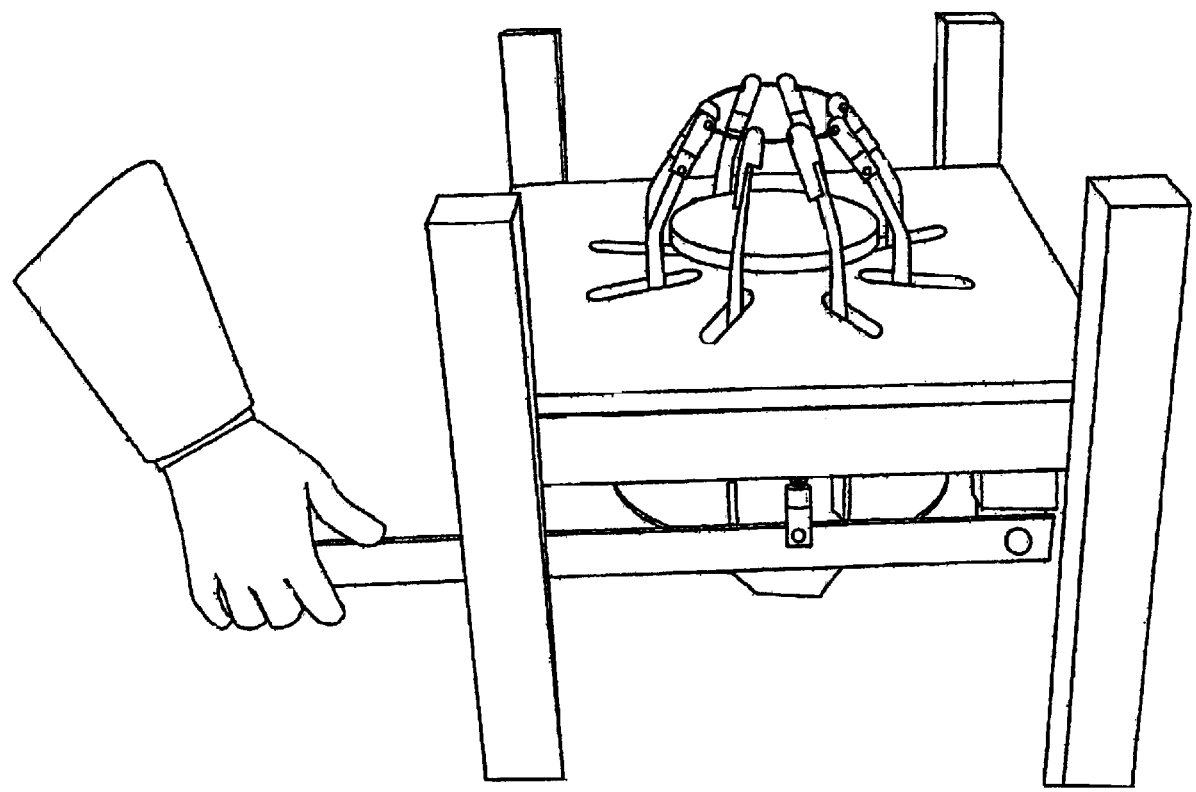
FIG. 8 is a perspective view of the invention in the position of FIG. 4.

As can be seen in FIGS. 2 through 4, the apparatus for mounting the device (10) for the presentation of individual bouquets of flowers comprises several movable pivoting draping fingers (15) associated with a tightening cord (16) for guiding the sheet (5) around the base element (2). The number of draping fingers (15) can vary in order to form a device (10) of predefined shape (cone, pyramid, etc.). The tightening cord (16) can be made of metal, plastic, or any other flexible material.

The apparatus includes a support base (20) for supporting the device (10), which is movable along a vertical axis. A guide means (21) of predetermined shape, for example conical, is connected to the support base (2) in order to guide all the draping fingers (15) and give a predefined shape to the device (10).

An activating means, for example a manual lever (30), shifts the support base (20) and guide means (21) along the vertical axis, which causes all the draping fingers (15) to pivot. When pivoting, the draping fingers (15) are guided by the guide means (21) in such a way as to tighten the tightening cord (16) around sheet (5).

The apparatus also includes a table (25) having an orifice (26) that allows the passage of the sheet (5) and the base element (2) so as to prime the fold through the orifice (26) of table (25).

The manual lever (30) pivotally connects to a movable axial connection element (34) that moves along the vertical axis to pivot the draping fingers (15) using pivots (17). The draping fingers (15) are also pivotally connected to a fixed support element (36). In operation, the movable axial element (34) rises and descends by activating lever (30) and fingers (15), which pivot around the fixed support element (36). According to FIGS. 3 and 4, by activating the lever (30), the support base (20) descends to continue draping (21) and the conical guide means (21) descends so that it guides the pivoting of draping fingers (15) and tightens the cord (16) around the sheet (5).

As shown in FIG. 5, the ends of tightening cord (16) are free. The cord (16) slides into openings (1 8) formed in each of the fingers (15) for tightening of the device (10). In the preferred embodiment, openings (18) are formed horizontally in the ends of the fingers (15) with a diameter slightly larger than the diameter of the cord (16) so that the cord (16) slides freely. The ends of the fingers (15) are arranged so that cord (16) forms a circle. The radius of this circle decreases by pivoting the fingers (15) due to activation of the lever (30), thereby, allowing the cord (16) to slide within the openings (18) of the fingers (15).

The lever (30) comprises a stoppage system (33) that keeps the lever (30) in the horizontal position when draping is completed and allows attachment of the sheet (5) around the bouquet with the fastener 9. After attachment is complete, the apparatus frees the device (10), which rises due to the action of the manual lever (30).

The guide means (21) is generally conical in shape so that the draping fingers (15) are guided by the guide means (21) while the support base (20) and the guide means (21) are simultaneously displaced, thereby, allowing a generally conical conjugated device (10) to be formed. Following the same principle, bases (2) of different shapes such as, square, triangular, rectangular, etc. can be considered to obtain a pyramidal device.

Figure 9:
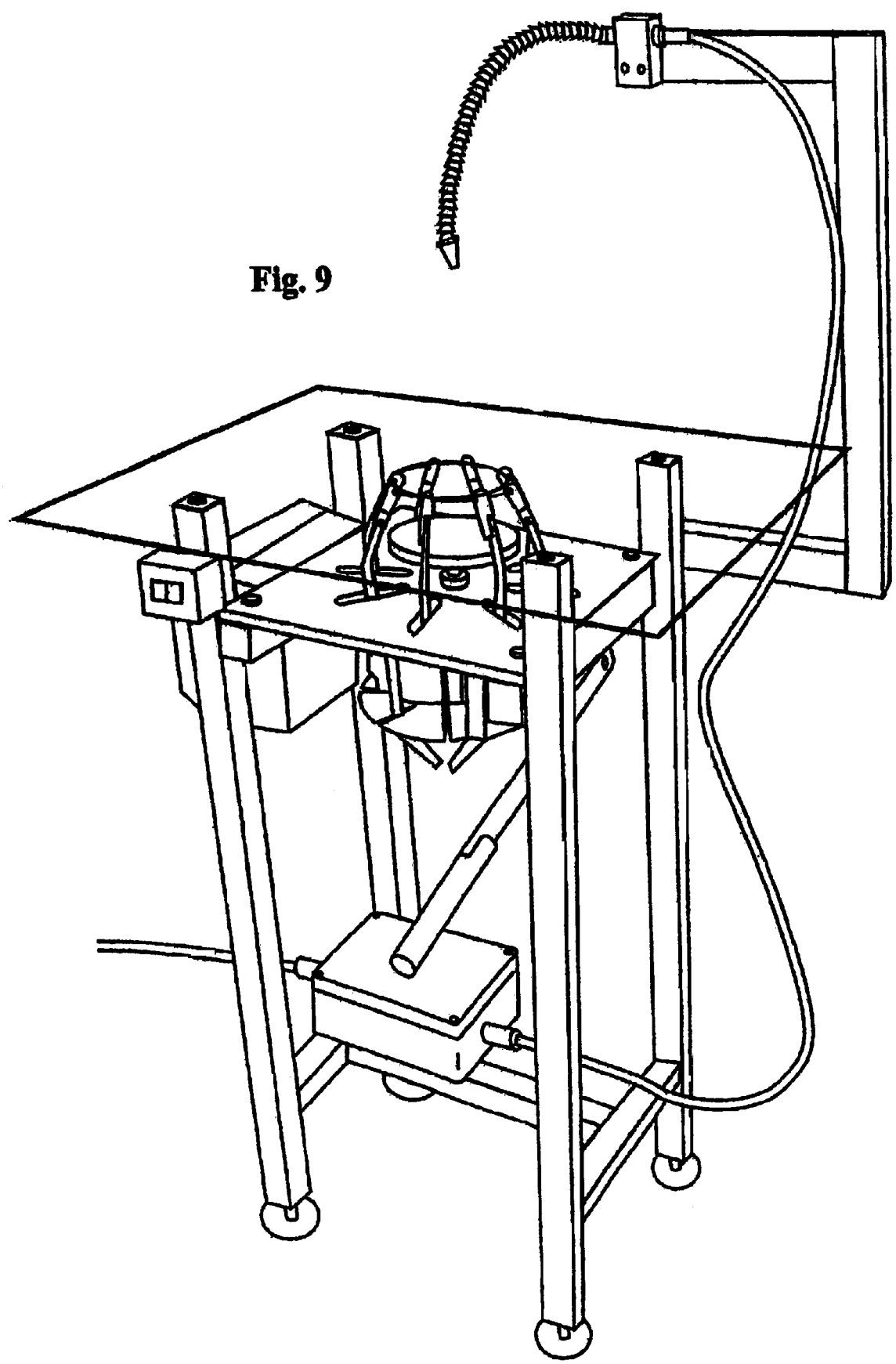
FIG. 9 is an assembly view of the embodiment of FIG. 2.
Figure 16:
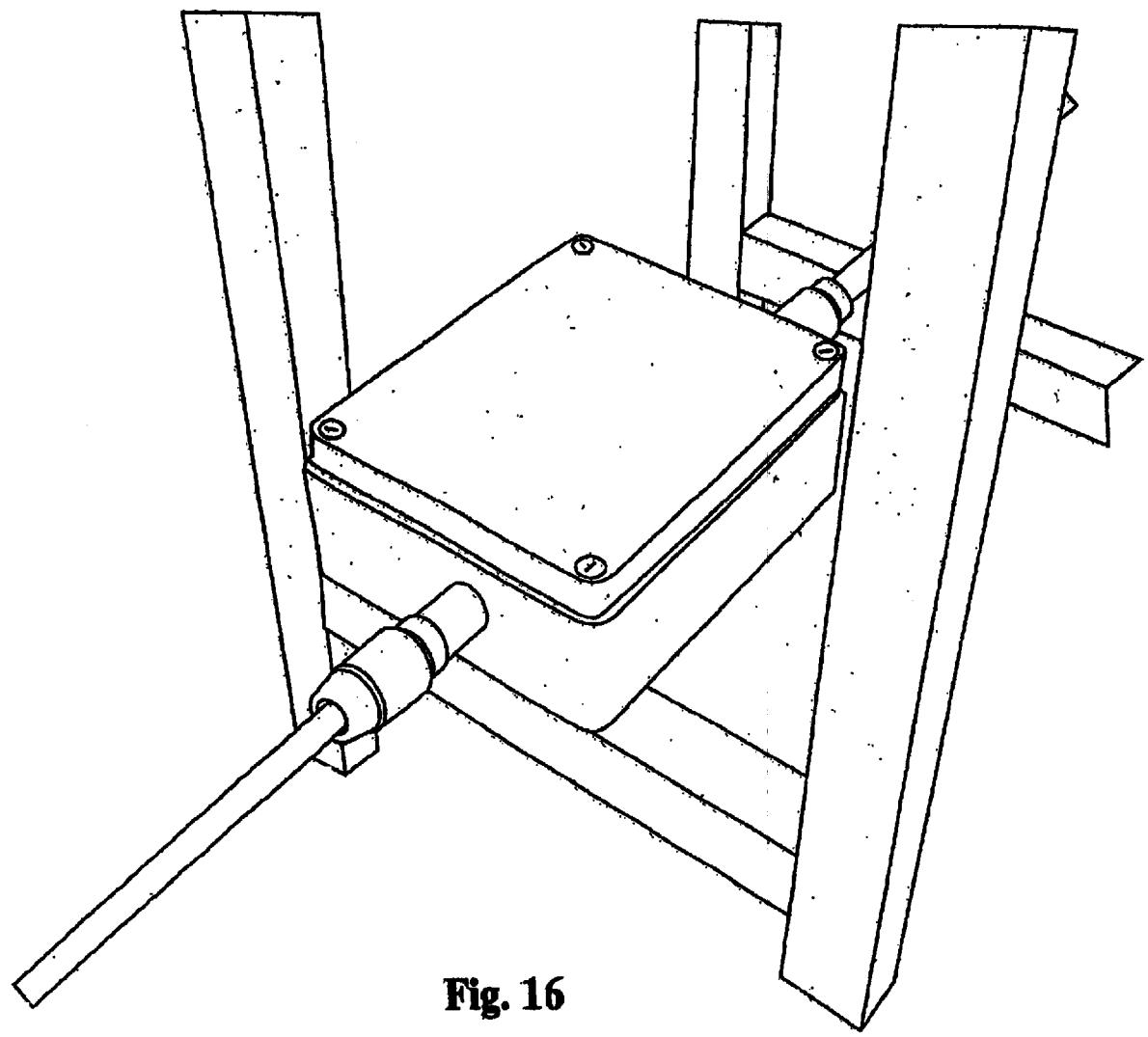
FIG. 16 is a perspective view of the system for filling the device according to the invention.

The apparatus of the invention can also comprise a source of water in combination with a pressure regulator and a solenoid valve controlled by an integral timer to fill the device with a predefined volume of water, as shown in FIGS. 9 and 16. As the device (10) is filled with water by the combination of a pressure regulator and a solenoid valve controlled by an internal timer, the operator tentatively defines a volume of water defined by:

$$\frac{\text{Pressure}}{\text{Opening time}} = \text{constant volume of water}$$

The filling system can be combined with a preserving product mixer for bouquets of flowers.

Attaching the draped sheet (5) with the fastener (9) can be done concurrently with filling the device (10) with water, either manually or by any automatic system known on the market or developed to specification.

Once filling and attachment is completed, the apparatus frees the bouquet and its water reserve either manually by lifting the lever (30) or mechanically, such as by a button. All operations can be steered by an automaton. In a preferred embodiment, the bouquet with or without support (2) will be brought to the station automatically.

The device in the present invention has two functions: 1) Draping of a sheet (5), which may or may not be watertight, around just one bouquet, which may or may not be equipped with a support (2), the completed device commonly called a water reserve bouquet; and 2) Adjustment and filling the device with a predefined volume of water.

According to the method of the invention, draping is combined with multiple fingers (15) following the descent, and the cord tightening sheet (5) with the system of preventing the sheet from being stuck, where these two combinations ensure a perfect "draping".

The method comprises the steps of: positioning the sheet (5) and the base element (2) on the support base (20) for supporting the device; priming the fold in the sheet (5) for passing the sheet (5) and the base element (2) through the orifice (26) in the support table (25); moving the support base (20) downwards along a vertical axis and the guide means (21) connected to the support base (20) in order to continue folding sheet (5); and guiding all the pivoting movable draping fingers (15) associated with tightening cord (16) in order to drape sheet (5) around base element (2) so as to tighten tightening cord (16) around draped sheet (5), and holding sheet (5) around the bouquet by fastener (9) comprising of a ribbon (7).

By activating the lever (30), the lowering of support base (20) and guide means (21) is simultaneous with the pivoting of draping fingers (15), which are guided by guide means (21) to ensure a perfect shape of device (10).

Successive stages of the assembly method of the invention are illustrated in FIGS. 10 through 15.

Figure 10:
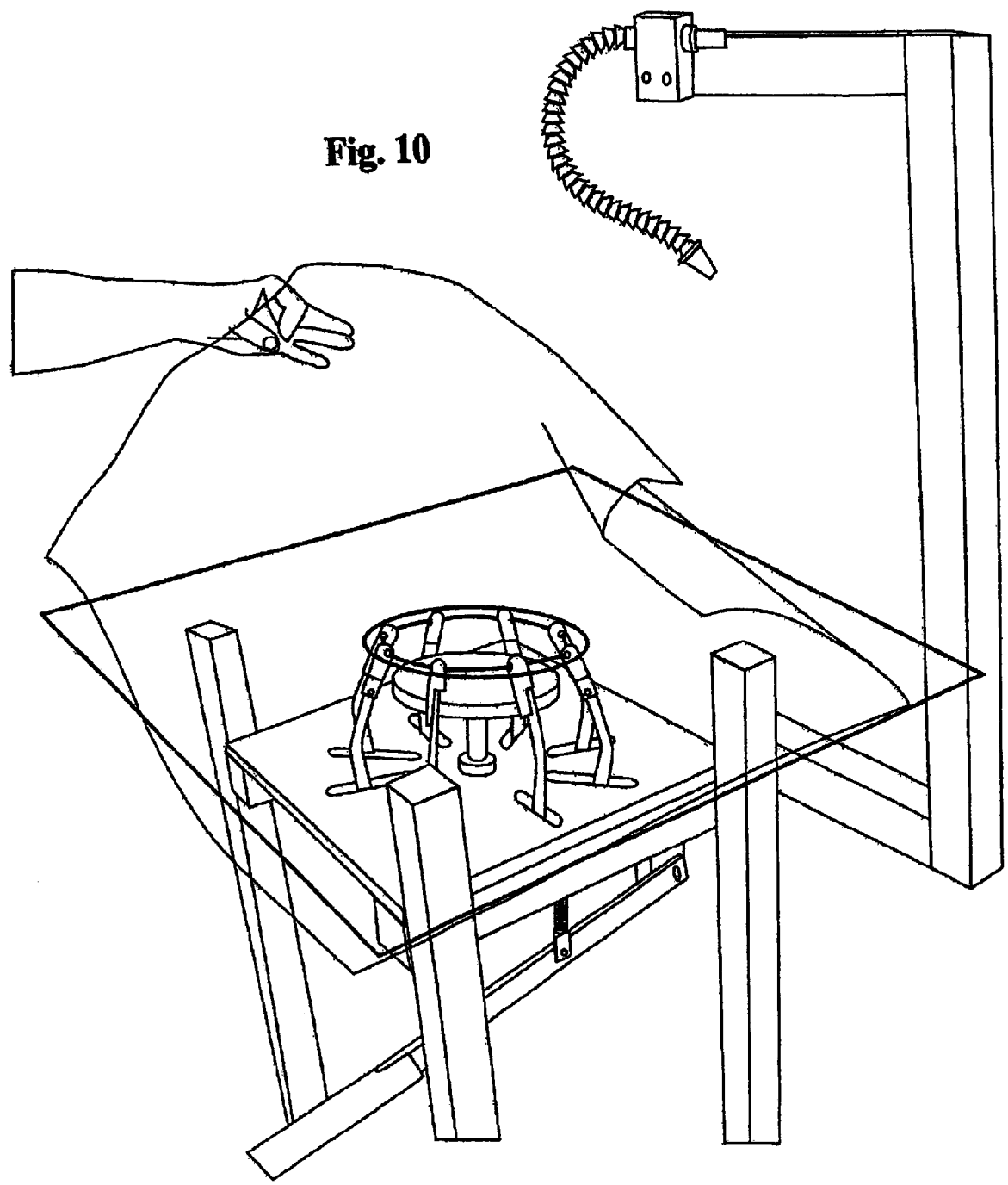
FIGS. 10 to 15 show the successive stages of the method of assembling the invention.

FIG. 10 illustrates positioning of a sheet (5) of paper on table (25) of the apparatus.

Figure 11:
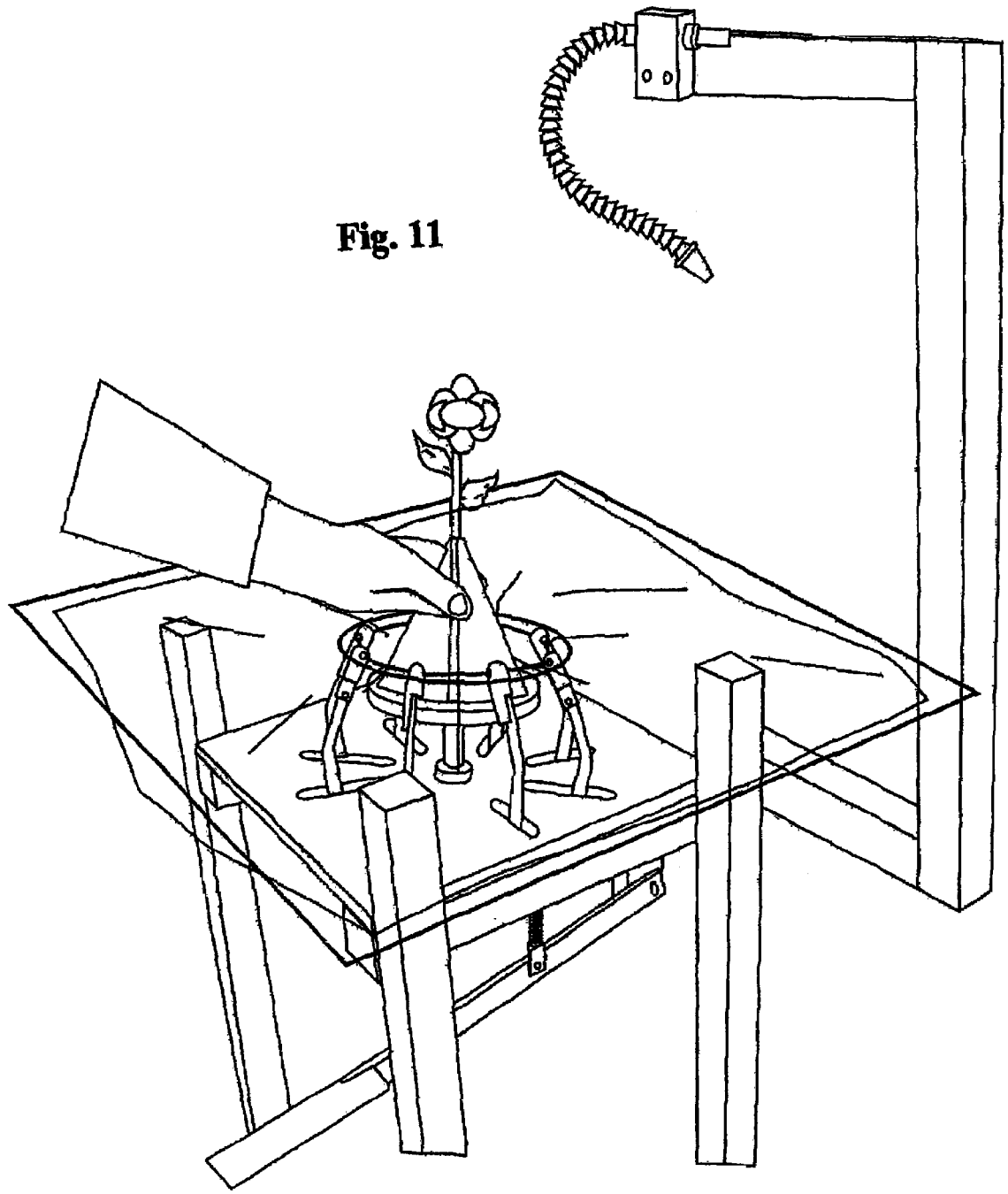

FIG. 11 illustrates priming of the folding by orifice (26) in the table by positioning the bouquet with or without base element (2) and by driving everything through the orifice (26).

Figure 12:
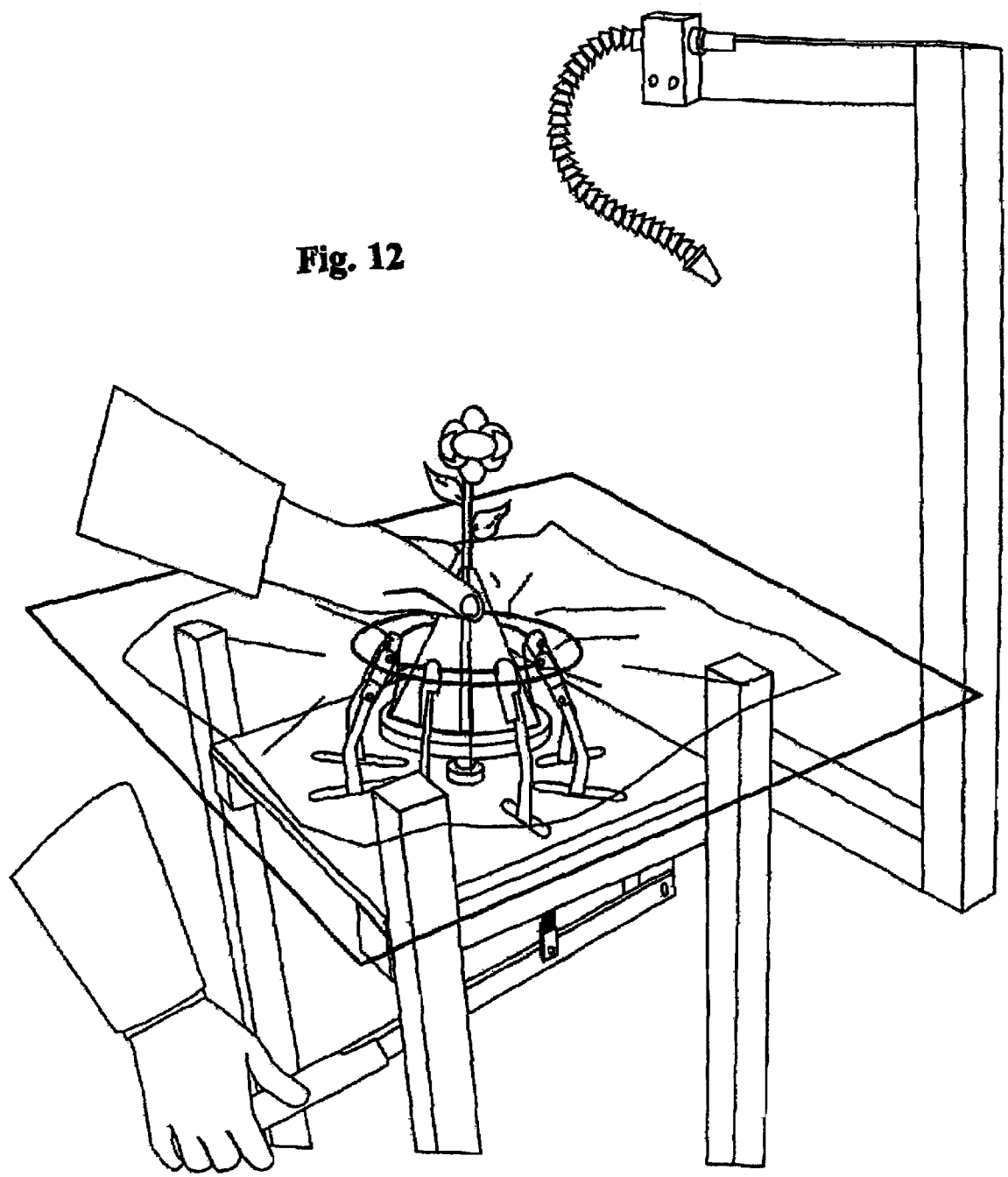
Figure 13:
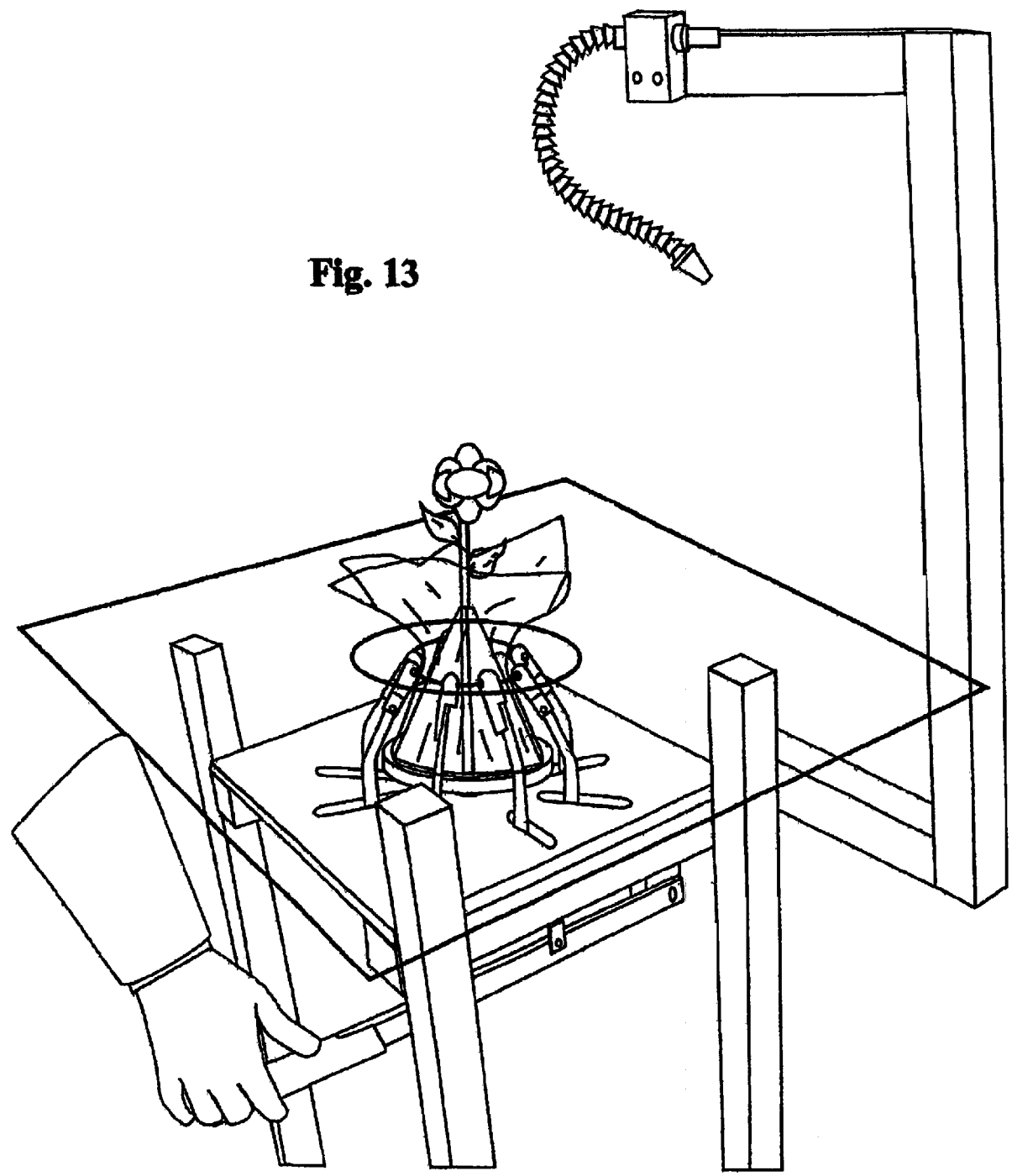

FIGS. 12 and 13 illustrate the activating of the lever (30) and draping the base element (2) with the sheet (5) and simultaneous driving and mounting the lever (30) (mechanical or manual).

Figure 14:
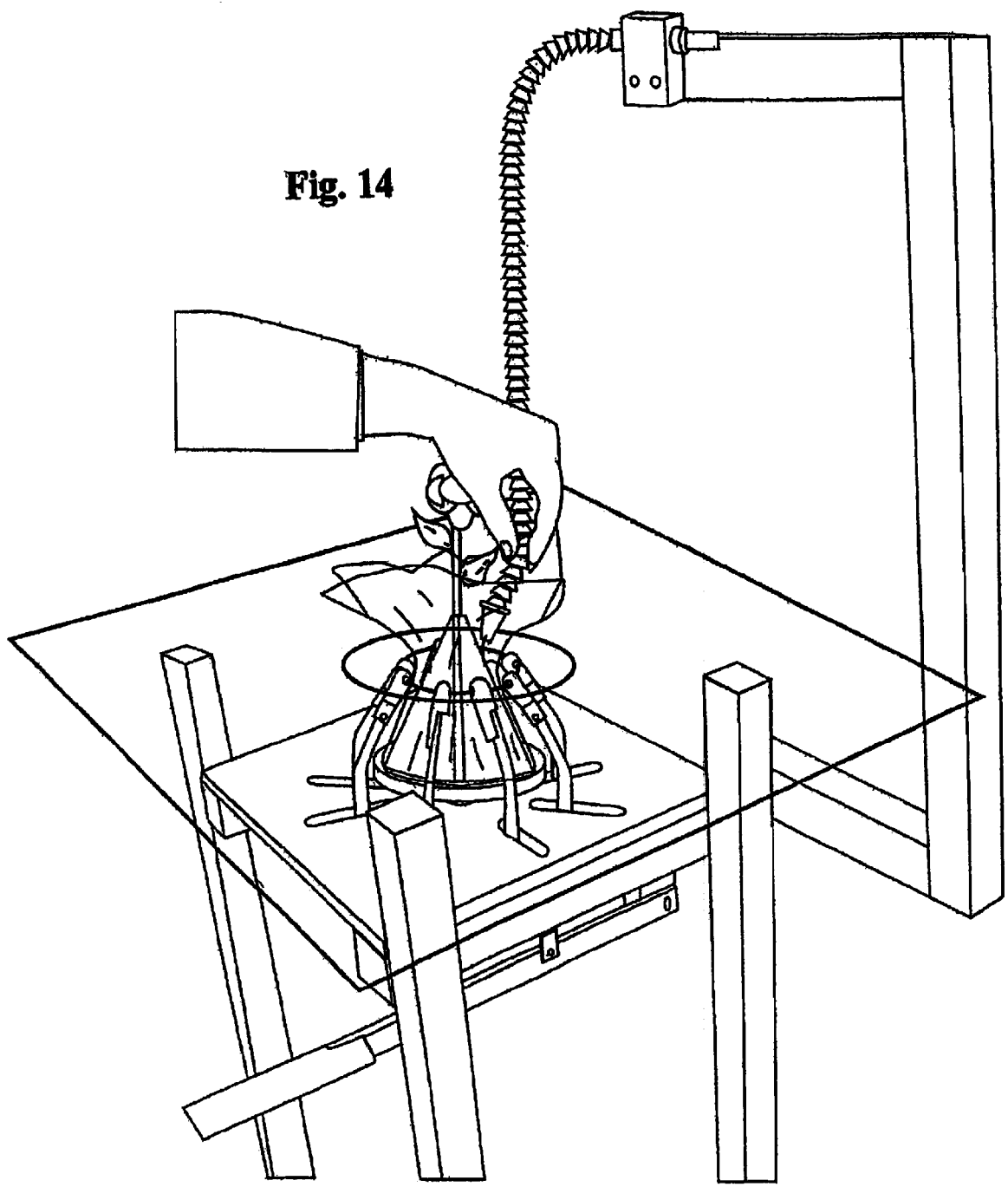

FIG. 14 illustrates filling the device (10) with water through upper orifice (6) of the device (10) concurrently with attaching the draped sheet (5) and blocking the system once draping has been completed.

Figure 15:
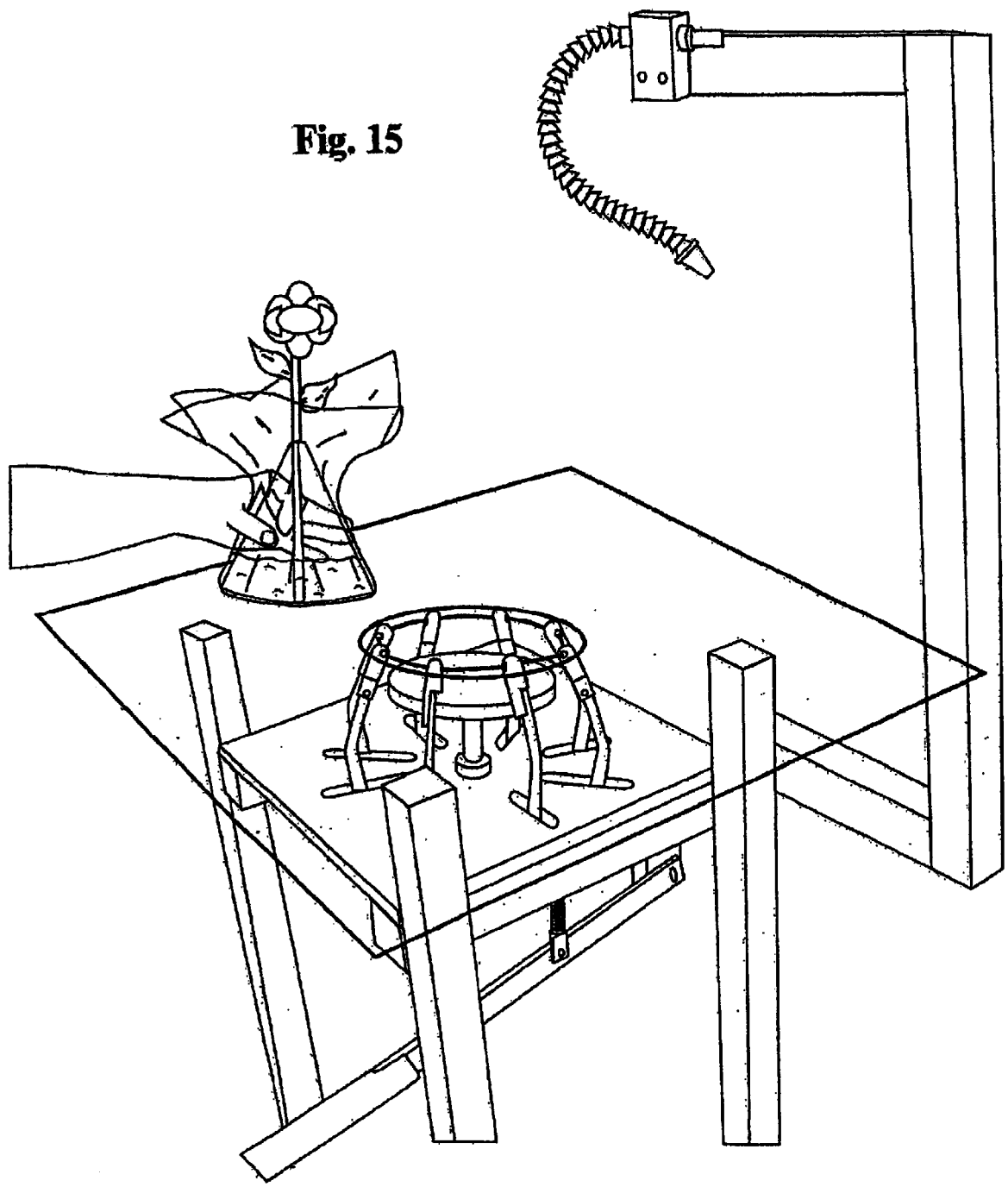

FIG. 15 shows withdrawal of the device (10) once filling and attachment is completed. The apparatus frees the bouquet and its water reserve manually by lifting the lever or mechanically with a button.

Figure 17:
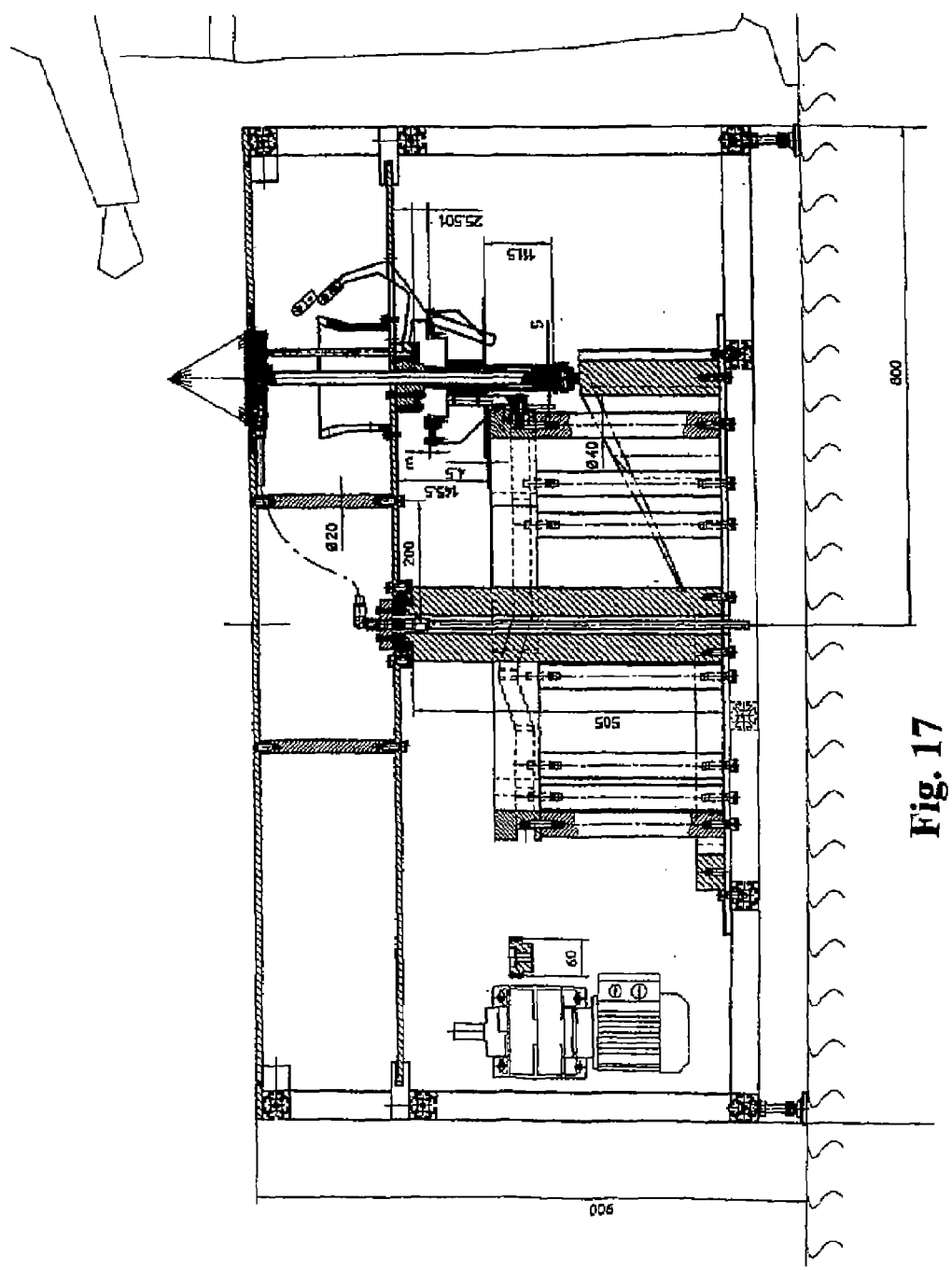
Figure 18:
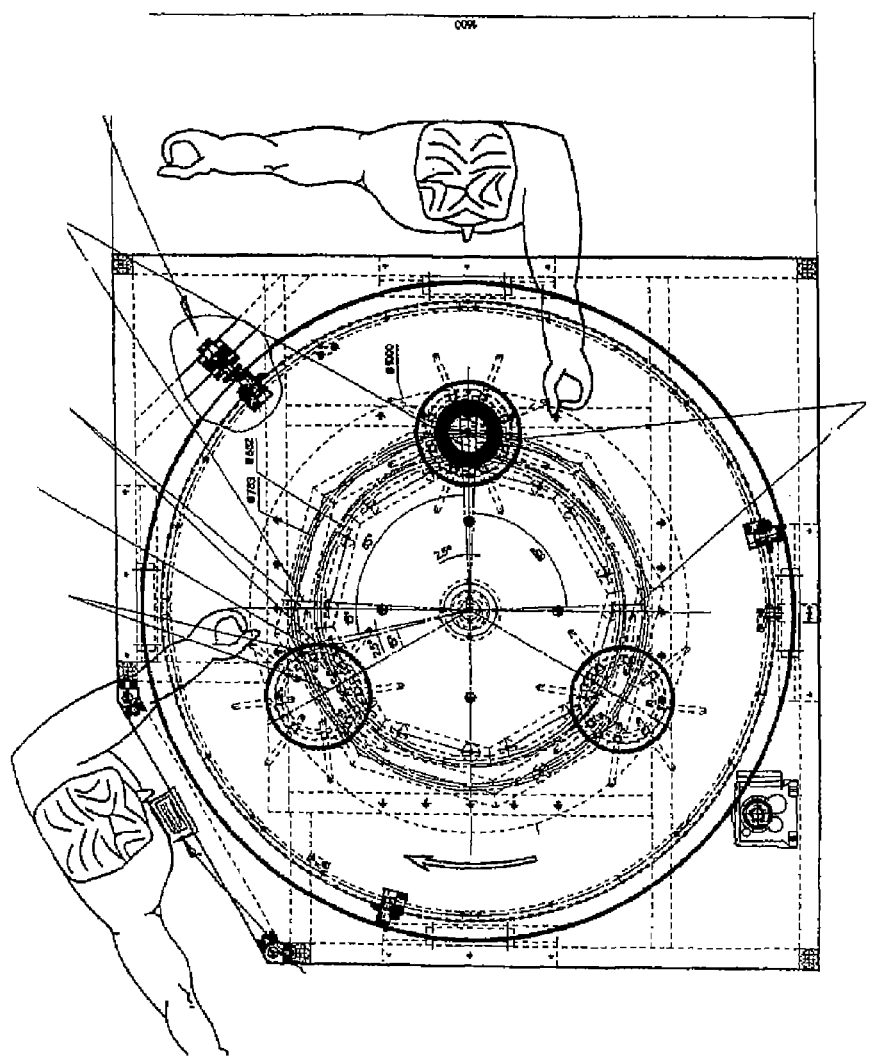

FIGS. 17-19 show the draping device in the invention used mechanically on an automated carousel. In particular, as shown in FIGS. 17-19, a series of draping devices of the invention (for example a series of three devices) can be arranged on a carousel that turns so as to automate the manufacturing process of the device for presentation of individual bouquets of flowers. It goes without saying that the draping device in the invention can therefore be used either manually, or mechanically on a carousel of this type.

What is claimed is:

1. Apparatus for assembling a device for the presentation of individual bouquets of flowers, comprising:
    a base element;
    a sheet placed under the base element and converging towards the center top of the device and held by a fastener for holding the sheet around the bouquet;
    several movable pivoting draping fingers associated with a tightening cord for guiding the sheet around the base element;
    a movable support base that follows a vertical axis in order to support the device;
    a means for guiding of predetermined shape connected to the support base for guiding all the draping fingers, and
    a means for activating that shifts the support base and the guide means along the vertical axis and makes the draping fingers pivot as they are guided by the guide means so that they tighten a tightening cord around the draped sheet.

2. The apparatus of claim 1, wherein the device further comprises:
    a table equipped with an orifice for passage of the sheet and the base element and priming a fold through the orifice in the table.

3. The apparatus of claim 1, further comprising:
    a source of water in combination with a pressure regulator and a solenoid valve controlled by an interval timer in order to fill the device with a predefined volume of water.

4. The apparatus of claim 3, further comprising:
    a mixer for preserving flowers.

5. The apparatus of claim 1, wherein the guide means is of a generally conical shape such that the draping fingers guided by the guide means during the simultaneous shifting of the support base and the guide means allow for shaping of the device as generally conical.

6. The apparatus of claim 1, wherein the means for activating comprises a manual activation lever connected to the support base in order to move the support base along the vertical axis.

7. A method of manufacturing a device for the presentation of individual bouquets of flowers, the device having a base element, and a sheet placed under the base element which converges towards the center top of the device and is held by a fastener for holding the sheet around the bouquet, the method comprising the steps of:
    positioning the sheet and the base element onto a support base to support the device;
    moving the support base downwardly along a vertical axis and a guide means of predetermined shape connected to the support base in order to proceed with folding the sheet;
    guiding multiple movable pivoting draping fingers associated with a tightening cord for draping the sheet around the base element so as to tighten the tightening cord around the draped sheet; and
    holding the sheet around the bouquet by the fastener.

8. The method of claim 7, wherein the fold in the sheet is primed by passing the sheet and the base element through an orifice in a support table.

9. The method of claim 7, wherein the lowering of the support base and of the guide means is simultaneous with the pivoting of the draping fingers by shifting a means for activating connected to the support base.

10. The method of claim 7, wherein attaching of the draped sheet is done in concurrent operation time as the device is being filled with water.

11. The apparatus of claim 1, wherein the base element includes a raised ridge all around its circumference.

12. The apparatus of claim 1, wherein the sheet is watertight.

13. The apparatus of claim 1, wherein the fastener comprises a ribbon.

14. The method of claim 7, wherein the base element includes a raised ridge all around its circumference.

15. The method of claim 7, wherein the sheet is watertight.

16. The method of claim 7, wherein the fastener comprises a ribbon.

* * * * *

UNITED STATES PATENT AND TRADEMARK OFFICE
CERTIFICATE OF CORRECTION

PATENT NO. : 7,318,297 B2  Page 1 of 1
APPLICATION NO. : 10/533478
DATED : January 15, 2008
INVENTOR(S) : Philippe Charrin It is certified that error appears in the above-identified patent and that said Letters Patent is hereby corrected as shown below:

Col. 2, Line 33
   Replace "embodiment"
   with -- mounting apparatus --

Col. 2, Line 35
   Replace "embodiment"
   with -- mounting apparatus --

Signed and Sealed this

Nineteenth Day of August, 2008

JON W. DUDAS
*Director of the United States Patent and Trademark Office*